(12) United States Patent
Soeseno et al.

(10) Patent No.: US 11,934,490 B2
(45) Date of Patent: Mar. 19, 2024

(54) METHOD OF AUTOMATICALLY CLASSIFYING TRANSITION MOTION (71) Applicants: Inventec (Pudong) Technology Corporation, Shanghai (CN); INVENTEC CORPORATION, Taipei (TW)

(72) Inventors: Jonathan Hans Soeseno, Taipei (TW); Ying-sheng Luo, Taipei (TW); Trista Pei-Chun Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 13 days.

(21) Appl. No.: 17/847,329

(22) Filed: Jun. 23, 2022

(65) Prior Publication Data
US 2023/0394116 A1    Dec. 7, 2023

(30) Foreign Application Priority Data
Jun. 7, 2022    (CN) .......................... 202210638227.3

(51) Int. Cl.
| | |
|---|---|
| *G06F 18/24* | (2023.01) |
| *G06F 18/231* | (2023.01) |
| *G06F 18/23213* | (2023.01) |
| *G06T 7/246* | (2017.01) |
| *G06T 13/40* | (2011.01) |

(52) U.S. Cl.
CPC ............ *G06F 18/24* (2023.01); *G06F 18/231* (2023.01); *G06F 18/23213* (2023.01); *G06T 7/246* (2017.01); *G06T 13/40* (2013.01)

(58) Field of Classification Search
None
See application file for complete search history.

(56) References Cited

U.S. PATENT DOCUMENTS

| | | | |
|---|---|---|---|
| 2013/0011083 A1* | 1/2013 | Berkovich | ............... G06F 16/50 382/305 |
| 2021/0272295 A1* | 9/2021 | Ahmadi | .................. G06T 7/207 |
| 2022/0292752 A1* | 9/2022 | Kang | ..................... G06T 13/205 |
| 2023/0260183 A1* | 8/2023 | Anderson | ............... G06T 13/40 345/473 |

FOREIGN PATENT DOCUMENTS

CN    111223168 A   *  6/2020 ............. G06T 13/00

* cited by examiner

*Primary Examiner* — Yingchun He
(74) *Attorney, Agent, or Firm* — Locke Lord LLP; Tim Tingkang Xia, Esq.

(57) ABSTRACT

A method for automatically classifying transition motion includes following steps performed by a computing device: obtaining a plurality of transition motions, with each transition motion being associated with a source motion, a destination motion, and a transition mechanism converting the source motion into the destination motion; extracting a property vector from each transition motion and thereby generating a plurality of property vectors, wherein each property vector includes a plurality of transition properties; and performing a clustering algorithm according to the property vectors to generate a plurality of transition types.

9 Claims, 9 Drawing Sheets

METHOD OF AUTOMATICALLY CLASSIFYING TRANSITION MOTION

CROSS-REFERENCE TO RELATED APPLICATIONS

This non-provisional application claims priority under 35 U.S.C. § 119(a) on Patent Application No(s). 202210638227.3 filed in China on Jun. 7, 2021, the entire contents of which are hereby incorporated by reference.

BACKGROUND

1. Technical Field

This disclosure relates to transition motions, and more particularly to a method of automatically classifying transition motions.

2. Related Art

Simulated virtual characters have been widely incorporated in many industries such as robotics, movies, and games. Although each of these industries may require different properties of the simulated character, one that remains crucial for all is the character's ability to perform many motions.

A versatile character is expected to transit from one motion to another, e.g., from canter to jump. In addition, it is expected to perform many different "styles" of transition. For example, when tacking an obstacle, the character might need to jump over a given obstacle to reach its goal. This single example of an obstacle already introduces many problem variations, as there would be cases where the character needs to jump over a tall-hurdle or a wide-gap. Here, a generic solution of performing Jump would be insufficient since the two problems need to be solved differently.

However, generating transition motions for a virtual character is not an easy task. Traditional methods are manual keyframe generation followed by motion interpolation. In media production, a key frame of keyframe is a location on a timeline which marks the beginning or end of a transition. It holds special information that defines where the transition should start or stop. The intermediate frames are interpolated over time between those definitions to create the illusion of motion. To generate different "styles" of transition motions, different sets of keyframes need to be generated, and this increases labor cost and time cost inefficiently.

SUMMARY

Accordingly, the present disclosure proposes a control mechanism to integrate user-preferences seamlessly and robustly over the transition motion of virtual characters. Such a reliable control allows the virtual character to efficiently tackle many kinds of obstacles.

According to an embodiment of the present disclosure, a method of automatically classifying transition motion includes following steps performed by a computing device: obtaining a plurality of transition motions, wherein each of the plurality of transition motions is associated with a source motion, a destination motion, and a transition mechanism converting the source motion into the destination motion; extracting a property vector from each of the plurality of transition motions and thereby generating a plurality of property vectors, wherein each of the plurality of property vectors comprises a plurality of transition properties; and performing a classifying algorithm according to the plurality of property vectors to generate a plurality of transition types.

In view of the above, the present disclosure has the following contributions or effects: (1) Allow the user to select different styles of transition motions, and (2) The different styles of transition motions are generated automatically.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
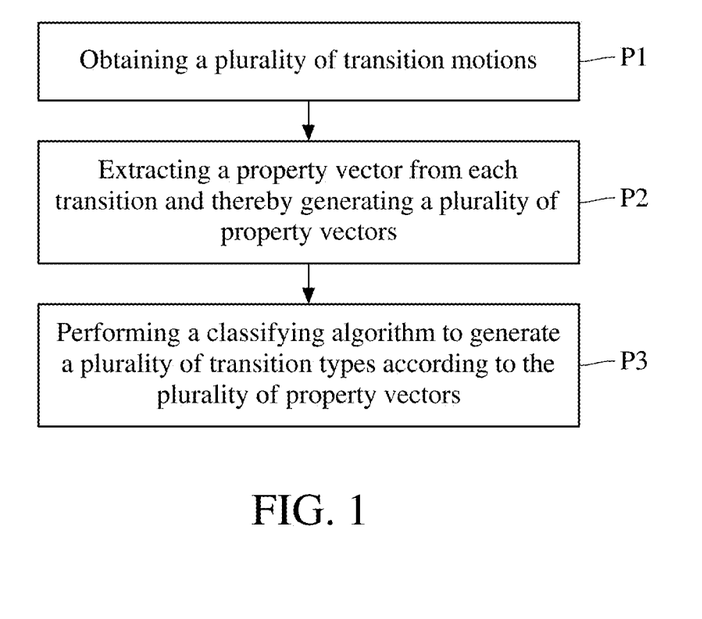
FIG. 1 is a flowchart of a method of automatically classifying transition motion according to an embodiment of the present disclosure.

FIG. 1 is a flowchart of a method of automatically classifying transition motion according to an embodiment of the present disclosure and the method includes steps P1-P3. The method is performed by, for example, a computing device. The computing device may be a microprocessor such as a CPU (central processing unit), a GPU (graphic processing unit), and/or AP (application processor); or a logic integrated chip such as an FPGA (field programmable gate array) and/or ASIC (application-specific integrated chip).

Figure 2:
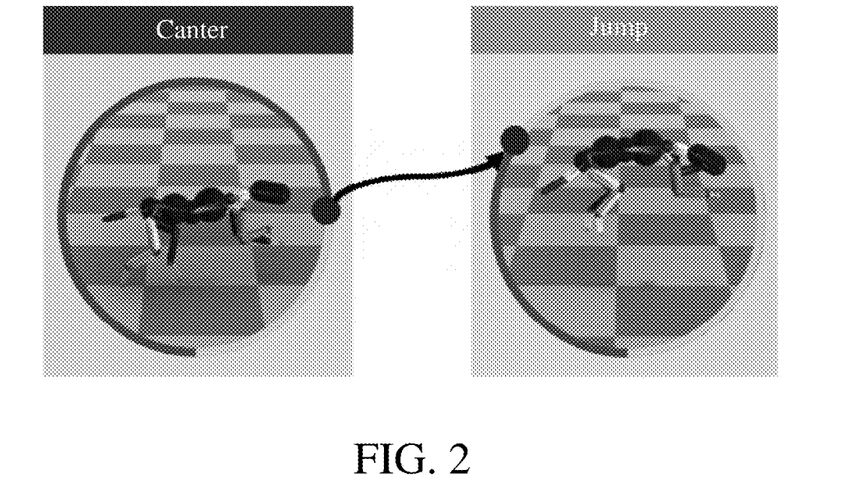
FIG. 2 is a schematic diagram of a transition motion.

In step P1, the computing device 50 obtains a plurality of transition motions. Each transition motion is associated with a source motion, a destination motion, and a transition mechanism that converts the source motion into the destination motion. FIG. 2 is a schematic diagram of a transition motion. This example shows a transition of a virtual character of a quadruped animal, from canter to jump, where the source motion is "canter" and the destination motion is "jump". Each of the source motion and the destination motion includes a plurality of phases. FIG. 2 shows a transition from a phase of the canter to a phase of the jump and said phases are denoted as black dots in FIG. 2. The phases represent different states of motion. For example, when the source motion is walking, the character bending the left knee is the first phase, the character raising and extending the left foot is the second phase, the character landing the left foot is the third phase, and the character bending the right knee is the fourth phase . . . and so on. In addition, for example, assuming that each of the source motion and the target motion each has four phases, 16 different transition motions may be generated theoretically. However, the transition quality of all transition motions needs to be calculated to ensure that the transition motion is visually smooth and conforms to the laws of physics in nature.

In an embodiment of step P1, the transition motion is generated by a complex motion controller. This complex motion controller is configured to control a robotic quadruped animal in a real world or a virtual quadruped animal in a virtual world. The transition mechanism is also called "transition motion tensor" (TMT). The following paragraphs supplement the establishment of the complex motion controller, as well as the details of TMT.

In another embodiment of step P1, the transition motion is a plurality of sets of keyframes. Each set of keyframes corresponds to a transition style. Each keyframe is equivalent to a pose feature. For example, the information contained in each keyframe may be described by a COM (center of mass) height of the character, a forward acceleration and a foot contact pattern, and/or a combination of the above. The COM height is a three-dimensional vector, such as [1.2 m, 0.9 m, 3.0 m]. The forward acceleration is also a three-dimensional vector, such as [121 cm/s$^2$, –89 cm/s$^2$, 78 cm/s$^2$]. The foot contact pattern may be, for example, a four-dimensional vector where each element is a Boolean denoting the contact state for each leg at a given frame. For instance, (0, 0, 1, 1) means 2 legs of the quadruped character touching the ground at one exact frame.

In step P2, the computing device 50 extracts a property vector from each transition motion, and thereby generating a plurality of property vectors. In an embodiment, the computing device 50 may collect data of property vectors through multiple sensors disposed on a real robotic animal. Each property vector includes a plurality of transition properties. In an embodiment, these transition properties include the COM height of the character, the forward acceleration, and the foot contact pattern. The property vector is a high-dimensional vector. Based on the type of transition motion, the user can specify which transition properties the property vector should use. For example, the transition motion "canter-jump" is suitable to refer to the COM height, while the transition motion "canter-stand" is suitable to refer to the forward acceleration.

In step P3, the computing device 50 performs a classifying algorithm to generate a plurality of transition types. In an embodiment, the classifying algorithm is hierarchy clustering. In another embodiment, the classifying algorithm is K-means algorithm, and the value of K is generated by the elbow method. The value of K represents that the number of types after the transition motions are classified.

In the embodiment using the K-means algorithm, the details are described as follows. The first step is to randomly select K data points as central points from data points corresponding to the plurality of transition properties (such as COM height) as central points. The second step is to compute distance between every data point and the central point, and assign every data point to one of the K classes according to the distance. Regarding every class, the center point is re-determined by computing an average of all data points in this class. The above process will be repeated for an assigned number of iterations, or until the center points don't change much between iterations.

Figure 3:
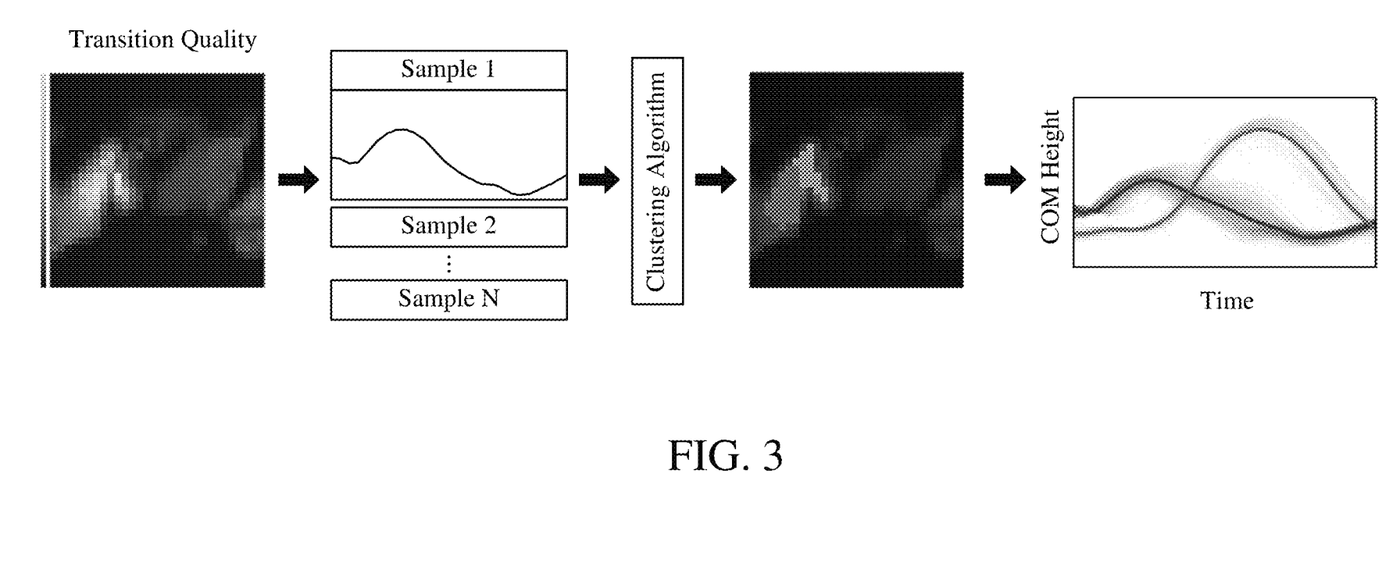
FIG. 3 is a schematic diagram of automatically classifying transition motion according to an embodiment of the present disclosure.

FIG. 3 is a schematic diagram of automatically classifying transition motion according to an embodiment of the present disclosure. The first graph from the left in FIG. 3 is a heatmap of the transition quality. Each point in the heatmap represents an implementation of a transition motion, e.g., from phase 1 of the source motion to phase 4 of the destination motion. The color of each point in the heatmap represents the magnitude of the transition quality. The lighter the color, the higher the transition quality is. The second graph from the left of FIG. 3 shows a plurality of transition properties extracted in step P2, and this graph takes the variance of the COM height as an example. After inputting the multiple transition properties shown in FIG. 2 into the classification algorithm, the heatmap of the transition quality can be divided into two classes as shown in the fourth graph from the left in FIG. 3. The transition properties corresponding to these two classes are shown in the fifth graph from the left in FIG. 3, which presents the variation of COM height over time.

Figure 4:
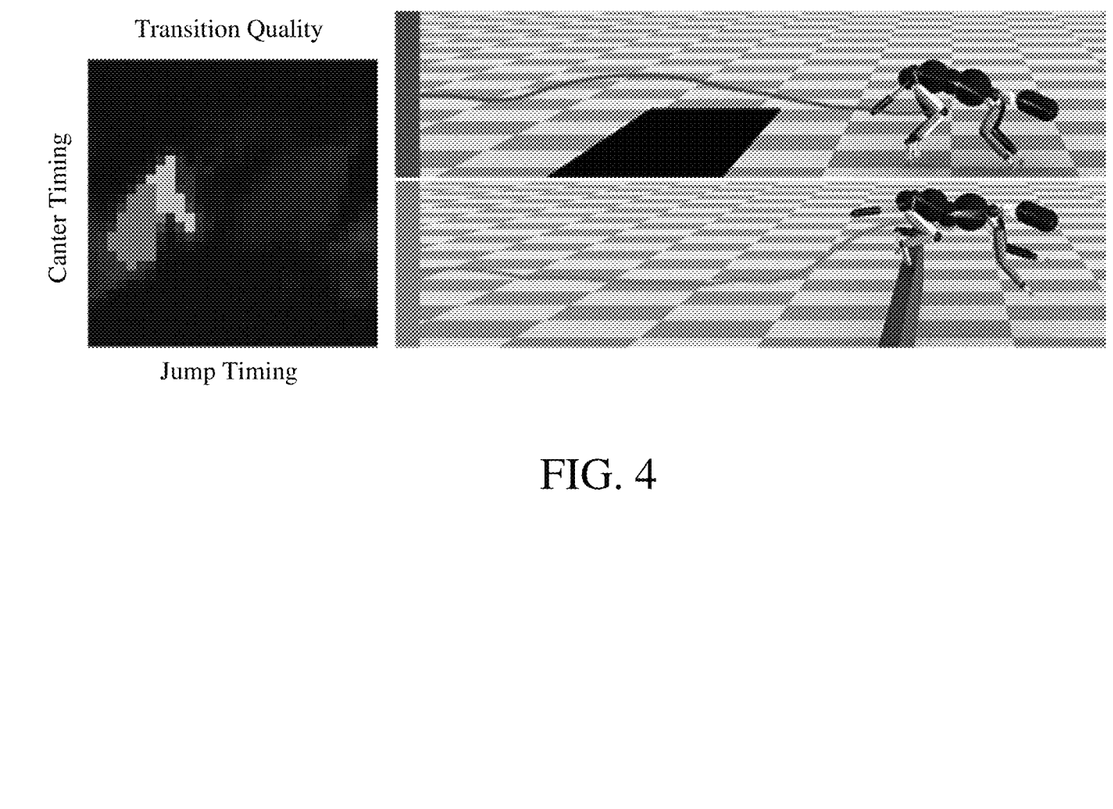
FIG. 4 is a schematic diagram of two types of transition motions.

FIG. 4 is a schematic diagram of two types of transition motions. In the upper diagram of FIG. 4, it can be seen that the first type of transition motion is suitable for jumping over wide gaps. In the lower diagram of FIG. 4, it can be seen that the second type of transition motion is suitable for jumping over high hurdles, because the degree of its COM height change is more drastic than that of the first type.

The following paragraphs further describe the establishment of the complex motion controller and detailed content of TMT.

The complex motion controller described in the following embodiment may be used to control a virtual character in movies, games, or robots in a real world. Please note that the term "controller" throughout the present disclosure is more likely to be considered as "a control module" or "a control unit" that performs data processing, executes commands, executes algorithms, etc., while the present disclosure does not specifically exclude the term representing a physical element.

Figure 5:
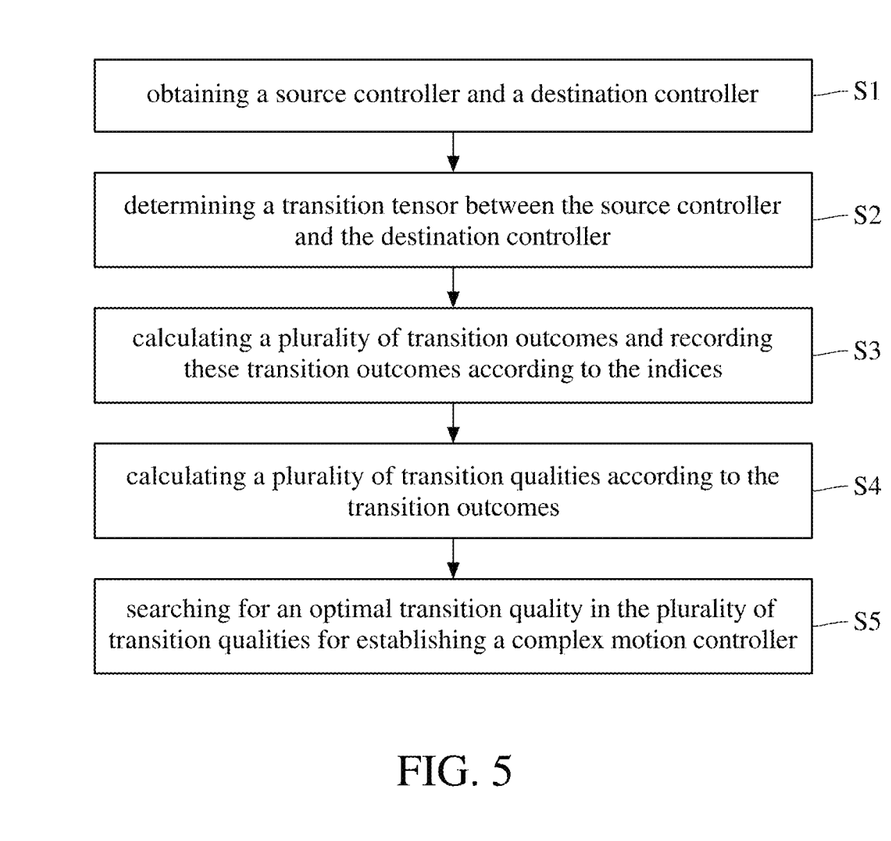
FIG. 5 is a flow chart of a method for establishing a complex motion controller according to an embodiment of the present disclosure.

FIG. 5 is a flow chart of the method for establishing a complex motion controller according to an embodiment of the present disclosure, and this method uses a computing device to perform steps S1-S5 shown in FIG. 1. Step S1 represents "obtaining a source controller and a destination controller", step S2 represents "determining a transition tensor between the source controller and the destination controller", step S3 represents "calculating a plurality of transition outcomes and recording these transition outcomes according to the indices", step S4 represents "calculating a plurality of transition qualities according to the transition outcomes", and step S5 represents "searching for an optimal transition quality in the plurality of transition qualities for establishing a complex motion controller". The implementation details of each step are described as follows.

Specifically, regarding "obtaining a source controller and a destination controller" in step S1, the source controller generates a source motion according to a current state of a character and a control objective, and the destination controller generates a destination motion according to another current state of the character and another control objective. For example, the source motion may be "walk", the destination motion may be "run" and the complex motion may be a transition from walk to run. The input of the control objective comprises at least one physical control parameter, such as meters per second of running, gravitational acceleration when falling from a higher ground.

The source controller and the destination controller are both template controllers, and details of the template controller are described as follows.

To enable a character to perform a wide array of motions in a simulated physical environment, it is common to train a physics-based controller to accommodate a large motion vocabulary (various types of motions). However, using a single controller to learn the entire vocabulary may require substantial computation as the learning process gets unbearably intricate with many motions. To avoid such a problem, the present disclosure adopts the explicit controller assignment strategy, where each motion is assigned to a single physics-based controller, further referred to as the template controller. This strategy allows for confining the training complexity within each controller, thereby making the process more tractable and independent.

Before training the template controllers, the present disclosure collects reference motion clips corresponding to each motion using the kinematic controller. Within each motion clip, the kinematic character performs the respective motion repeatedly with slight variations over the speed, heading, and height control on each repetition. Then, in order to produce life-like movements in a dynamic environment, the present disclosure trains the template controllers using deep reinforcement learning (DRL), where at a given time step t, the template controller $\pi$ ($a_t|s_t$, $c_t$) outputs the actions $a_t \in A$, given the current state of the character $s_t \in S$, and control objective $c_t$; A and S denote the domain of action and current state respectively. The current state $s_t$ stores the character's position, rotation, velocity, and angular velocity. The high-level control objective includes $c_t=(\sigma, \theta, \hat{h})$, where $\sigma$, $\theta$, and $\hat{h}$ denote the target movement speed in meters per second, target heading in radian, and target center-of-mass (COM) height in meters, respectively.

One or more embodiments of the present disclosure initializes the template controller by performing imitation learning over the assigned reference motion clip. In the process, the controller's goal is to match the joint positions of the kinematic character and simulated character, using two consecutive frames of the kinematic character as the low-level control objective. Once converged, the present disclosure further fine-tunes the template controller to follow high-level motion control directives, including speed, heading, and COM height. Note that since the values of the control objectives come from the reference motion clip, it is not required to specify all values all the time. For instance, the target COM height can be left unchanged when performing motions such as "Trot" or "Canter," but is required to control the COM height of the "Jump" motion.

Figure 6:
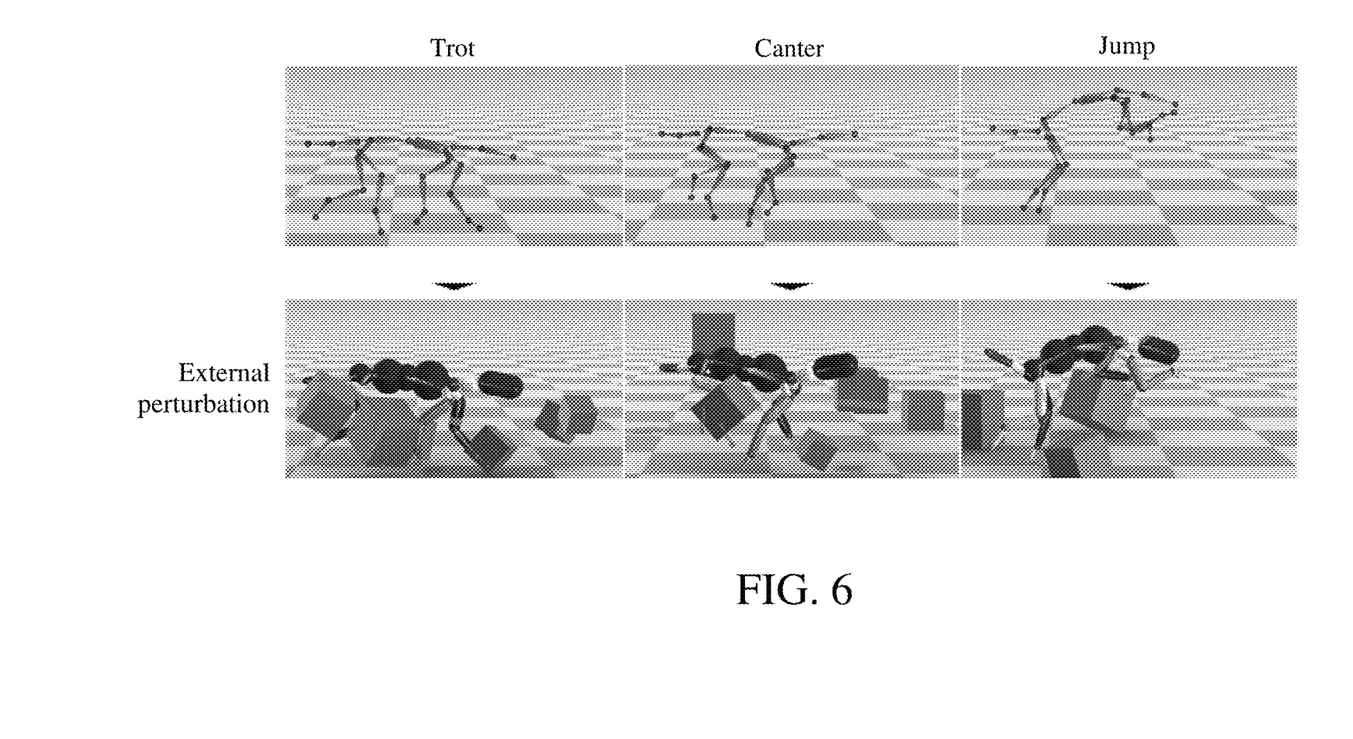
FIG. 6 is a schematic diagram of introducing external perturbations in the process of training the template controller.

To ensure the robustness of each template controller, the present disclosure introduces external perturbations during the training process, such as throwing various-sized boxes at the character from random directions as shown in FIG. 6. As a result, the present disclosure may obtain a set of controllable and robust template controllers $\psi=\{\pi_1 \ldots \pi_6\}$, each specializing in a specific motion in the vocabulary V={Trot, Canter, Jump, Pace, Stand, Sit}, with the elements denoting motions of trot, canter, jump, pace, stand, and sit, respectively.

The present disclosure trains the template controllers using proximal policy optimization (PPO), generalized advantage estimator GAE($\lambda$), and multi-step returns TD($\lambda$). To increase sampling efficiency and prevent the controller from getting stuck in bad local optima, the present disclosure adopts the early termination and reference state initialization as proposed by "Xue Bin Peng, Pieter Abbeel, Sergey Levine, and Michiel van de Panne. 2018. DeepMimic: Example-Guided Deep Reinforcement Learning of Physics-Based Character Skills. ACM Transactions on Graphics (TOG) 37, 4 (2018), 143.".

The present disclosure represents each template controller as a hierarchical policy with lower-level controllers called the primitives. Each of the template controllers uses four primitives except for the Jump motion, which requires eight primitives to account for its additional motion complexity.

The template controllers only allow the character to perform a specific motion, limiting the character's ability to solve complex tasks that may require multiple motions to work coherently. For instance, to jump over a wide hole and quickly reach the destination, the character needs to run fast enough, followed by jumping and running towards the destination. However, knowing when to perform the transition between running and jumping is not a trivial task since the character's state directly affects the transition outcome. As a result, naively switching between the controllers may yield awkward or even unsuccessful transitions. Therefore, the present disclosure proposes a data-driven transition tensor in step S2 that guides the character in successfully transitioning from one motion to another by carefully examining the critical timing of the transitions.

Regarding "determining a transition tensor between the source controller and the destination controller" in step S2, the transition tensor (hereinafter referred to as tensor) has a plurality of indices, one of these indices corresponds to a plurality of phases of the source motion. For example, the source motion is "raising the left hand", which includes multiple phases such as the rotation of the elbow joint at 0 degree, 1 degree, 2 degrees, 3 degrees . . . to the upper limit of the rotatable angle.

Given that the character is in a particular state with the source controller, as the controller is switched from the source to the destination controller, the destination controller may have never seen this state. While it tries to recover from this unseen state, it consequently generates a new transition motion, which neither exists in the source controller nor the destination controller. That is, the transitions are generated by switching between the pair of controllers.

However, naively switching the controllers yields unstable transitions since the motions vary in difficulties. It is possible to improve the switching process by assigning control objectives compatible with both the source and the destination motions, such as interpolating the movement speed to transition between different locomotion gaits. However, this strategy is ineffective for motions that require more delicate and precise foot-fall timing which is best described with the character's phase label. For instance, the success of a transition between "Canter" and "Jump" relies heavily on the character's foot touching the ground. Therefore, transitioning from "Jump" to "Canter" when the character is mid-air may cause intricacies for the destination controller, leading to a longer time to stabilize, exerting too much force, deviating from the control objectives, or even worse, causing the character to fall.

To describe the likelihood of a successful transition between source and destination motions, the present disclosure formulates a 4-dimensional tensor T to record the outcomes of the transitions, as shown in Equation 1.

$$T_{m,\phi,n,\omega}=(\eta,\Delta t,e,a) \quad \text{(Equation 1)}$$

The four indices of the tensor T include the source controller $m \in V$ and the destination controller $n \in V$ motions, wherein V denotes vocabulary, as well as the source phase $\phi \in [0, 1)$ and the destination phase $\omega \in [0, 1)$. Note that each of the components $(\eta, \Delta t, e, a)$ should be dependent on $w=(m, \phi, n, \omega)$, e.g. $\eta = \eta_w$.

Each element $T_w$ from the tensor is a 4-dimensional vector representing the outcome of a transition at w. The first element of the vector $\eta$ records the alive state after the transition, in which $\eta=1$ denotes a successful transition where the character's head, torso, and back do not touch the ground, and $\eta=0$ if the character falls. The second element $\Delta t$ denotes the duration of transition which begins with the switching process and ends when the destination controller stabilizes. The third element e represents the effort of the transition, for example, a summation of all joint's torque during the transition, as shown in Equation 2.

$$e = \sum_{t}^{t+\Delta t} \sum_{j=1}^{J} \tau_t^j \quad \text{(Equation 2)}$$

The PD-controller's torque of joint $j \in J$ at a given time t is denoted as $\tau_t^j$, J denotes the number of joints of the character, and j denotes the joint label. To measure how well the character follows the control objective, the present disclosure defines the speed, heading, and height rewards respectively as Equations 3, 4, and 5.

$$r_t^\sigma = \exp(-0.8(\sigma - \|v_c\|)^2) \quad \text{(Equation 3)}$$

$$r_t^\theta = \left(\frac{u \cdot v_c}{\|u\| \cdot \|v_c\|} + 1\right) * 0.5 \quad \text{(Equation 4)}$$

$$r_t^h = \exp(-3\|h - \hat{h}\|) \quad \text{(Equation 5)}$$

Here, $\|.\|$ denotes the 12-norm, $v_c$ and $u=(\cos(\theta), -\sin(\theta))$ respectively denote the character's COM velocity and the target heading projected onto the 2-dimensional plane of motion, and h, ĥ respectively denote the character's COM heights of the source motion and destination motion. The present disclosure then defines the control reward as Equation 6.

$$r_t^C = \frac{r_t^\sigma + r_t^\theta + r_t^h}{3} \quad \text{(Equation 6)}$$

Finally, the fourth element a of the tensor T denotes the control accuracy of the character measured by the sum of control rewards between the two stable states of the destination controller $\hat{t}_1, \hat{t}_2$. The present disclosure measures the control accuracy post-transition under an assumption that there are no data for controlling the accuracy of the transition. The control accuracy is defined as Equation 7.

$$\alpha = \sum r_t^C \quad \text{(Equation 7)}$$

Before computing the four outcomes of each transition tensor in step S3, the present disclosure evaluates the template controller through robustness tests, which involves, for example, throwing boxes with varying sizes and densities from a random direction every 0.1 seconds. The template controller passes the robustness test when the character survives for at least 10 seconds.

Figure 7:
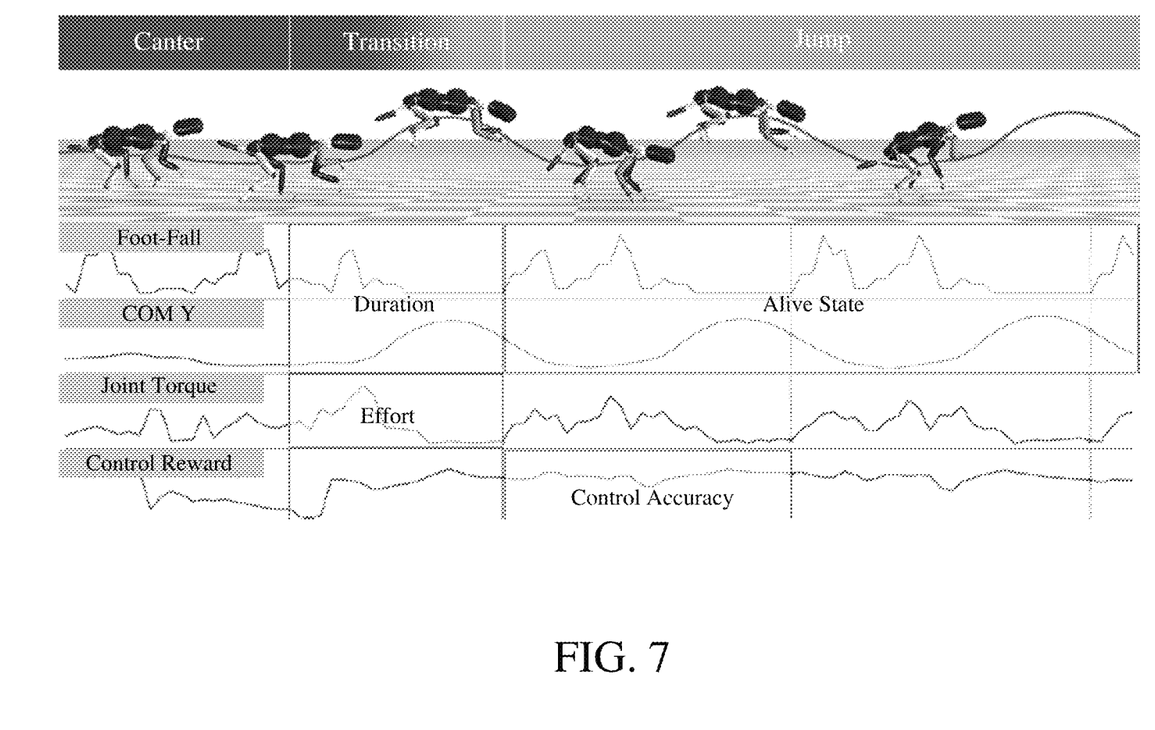
FIG. 7 is a schematic diagram of the variance of the transition tensor during the transition process from the source motion to the destination process.

FIG. 7. is a visual illustration of the variance of the transition tensor during the transition process from the source motion (e.g. Canter) to the destination motion (e.g. jump). A recording begins with the character performing the source motion. The present disclosure waits until the source controller stabilizes before switching the currently active controller to the destination controller. While switching, the present disclosure feeds in the character's current state and high-level control objectives derived from the destination motion clip, sampled uniformly over the phase. Next, the present disclosure records how the controller reacts, and stores the character's foot-fall pattern, COM position, joint torques, and control accuracy (as equation 7). The present disclosure terminates the recording 5 seconds after the controller switching process since most controllers have either stabilized or fail at this point.

Regarding "calculating a plurality of transition outcomes and recording these transition outcomes according to the indices" in step S3. The computing device use Monte Carlo method to calculate a plurality of outcomes, each outcome comprises the alive state n, transition duration $\Delta t$, effort e, and control accuracy $\alpha$.

To calculate the likelihood of the transitions, the present disclosure populates the tensor by recording millions of transition samples using the Monte Carlo method in a physics-enabled environment. Each pair-wise transition is sampled uniformly across phases of the source motion and destination motion.

Regarding "calculating a plurality of transition qualities according to the transition outcomes" in step S4, wherein each transition quality comprises stability and an outcome value, the outcome value is calculated by the computing device according to the alive state, transition duration, effort, and control accuracy.

As shown in Equation 1, with the 4-dimensional tensor describing the likelihood of transitions between source and destination controllers, the present disclosure unifies the template controllers, allowing the character to perform all motions in the vocabulary V. Users can utilize the unified controller to steer the character when solving more complex tasks. To achieve this, the present disclosure starts with consolidating the four transition outcomes into a single number as Equation 8, wherein $\Gamma_w$ denotes the outcome over the index w.

$$\Gamma_w = \eta_w \times \frac{\alpha_w}{e_w} \times \exp(-\Delta t_w) \quad \text{(Equation 8)}$$

To measure the transition stability, the present disclosure wishes to further ensure consistency of outcomes and alive probability at neighboring samples. For this purpose, the present disclosure first defines a local neighborhood $\Gamma_w(\delta)$ which is a 2-dimensional sub-tensor of $\Gamma$ near w, and $w \in \{m, \phi \pm \delta, n, \omega \pm \delta\}$, wherein $\phi \pm \delta$ denotes a plurality of neighboring reference phases of the source motion m over phase $\phi$, and $\omega \pm \delta$ denotes a plurality of neighboring reference phases of the destination motion n over phase $\omega$.

Then, the present disclosure can calculate the consistency of the transition outcome $\zeta_w(\delta)$ as the variance of all samples in $\Gamma_w(\delta)$.

Similarly, the present disclosure computes the alive probability of a transition $\eta_w(\delta)$ as the proportion of samples within $\Gamma_w(\delta)$ having $\eta=1$.

The final form of the transition's stability is shown as Equation 9, wherein $\beta=0.015$.

$$\psi_w(\delta)=\eta_w(\delta)\times\exp(-\beta\zeta_w(\delta)) \quad \text{(Equation 9)}$$

Combining the transition stability and the outcome values, the quality of a transition at w is shown as Equation 10.

$$Q_w=\psi_w(\delta)\times\Gamma_w \quad \text{(Equation 10)}$$

Regarding "searching for an optimal transition quality in the plurality of transition qualities for establishing a complex motion controller" in Step s5. The complex motion controller is used to generate a complex motion corresponding to one of the plurality of phases of the source motion.

Figure 8:
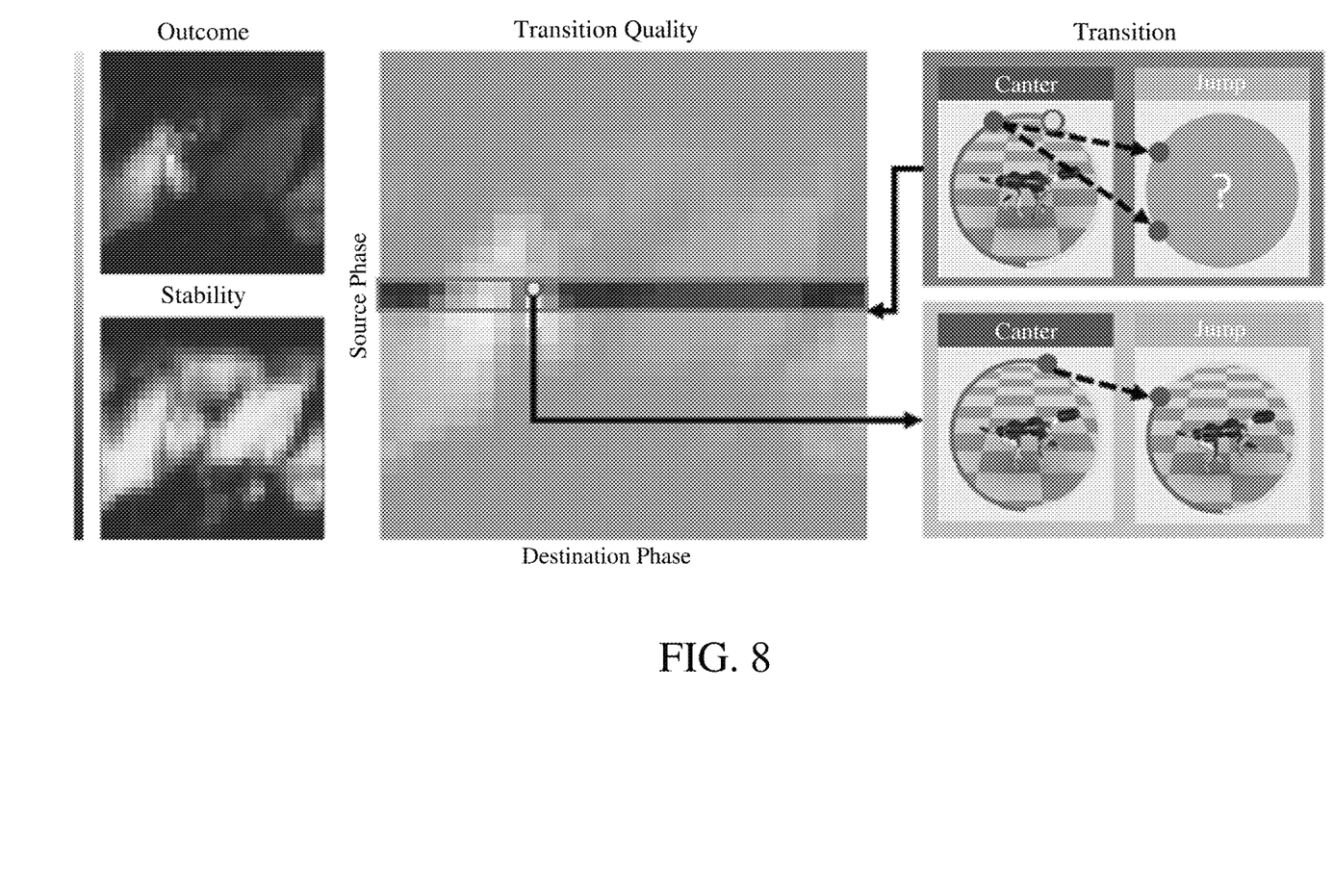
FIG. 8 is a heat map and application diagram of the transition quality and its components.

To generate the transition from the source motion to the destination motion, it needs to navigate through the tensors and search for the best transition. Given the destination motion label n, and the information regarding the source motion m and phase $\phi$, the computing device can find the best transition by looking at the sub-tensor $Q_{m,\phi\pm\epsilon,n}$, where $\epsilon$ is an adjustable parameter for the search space, and locate the destination phase with highest quality value, as shown in FIG. 8. Using the best transition obtained from the tensor, transitions can be performed reliably between two controllers. Repeating the same strategy for each pair-wise transition between all motions, the present disclosure successfully unifies the template controllers into a single and versatile controller that can produce complex motions.

FIG. 8 is a heat map and application diagram of the transition quality and its components (outcome values and stability). With the phase of the source motion as the vertical axis and the phase of the destination motion as the horizontal axis, the computing device can depict heat maps of the outcome values, stability, and transition quality calculated by the outcome values and the stability. The present disclosure can find, from multiple pixels of the heap map of the transition quality, the transition tensors corresponding to the transition qualities whose pixel values exceed the threshold, and filter one or more transition with better effects, such as alive state being "1", lower effort, shorter transition duration, and higher control accuracy.

Figure 9:
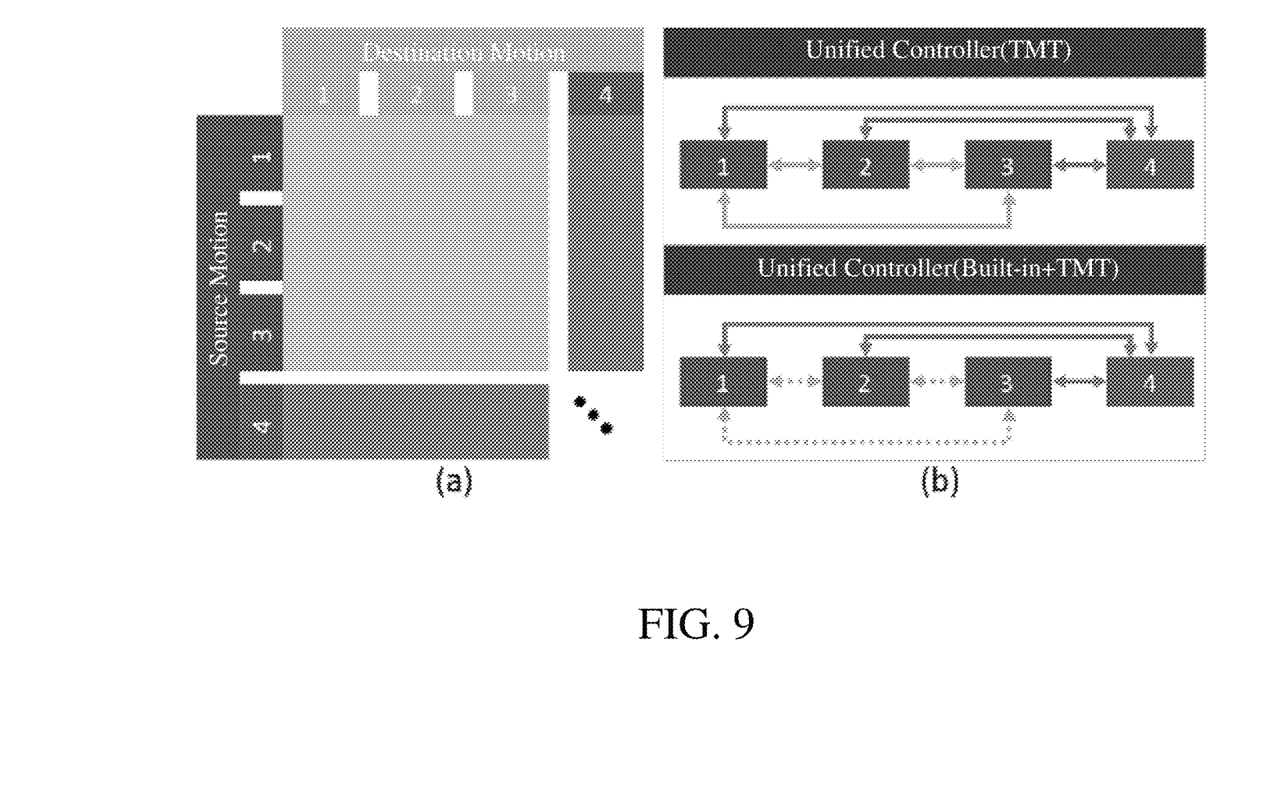
FIG. 9 is a schematic diagram of adding a new template controller.

FIG. 9 is a schematic diagram of adding a new template controller (new motion). The present disclosure uses the transition tensor to simply add new motions without increasing training costs. Specifically, the present disclosure only needs to use the template controller to describe the new motion and integrate it to the original template controller through the transition tensor. Here is the example of FIG. 9, according to the method proposed by the present disclosure, six transition tensors have been established previously, and each transition tensor is a pair consisting of two of motion 1, 2, and 3, These six transition tensors are "motion 1 to motion 2", "motion 1 to motion 3", "motion 2 to motion 3", "motion 2 to motion 1", "motion 3 to motion 1", "motion 3 to motion 2", wherein different orders in a pairing will form different transition tensors). During the adding of the motion 4, the present disclosure only spends the cost on establishing the transition tensors between the new motion 4 and each of the motions 1, 2, and 3. This process does not require an additional training process, and adding more motions will not change the motions and transitions previously configured. Therefore, the present disclosure can easily extend the motion vocabulary V along the dimension of the source motion label m of the tensor and the dimension of the destination motion label n, as shown in FIG. 9.

Figure 10:
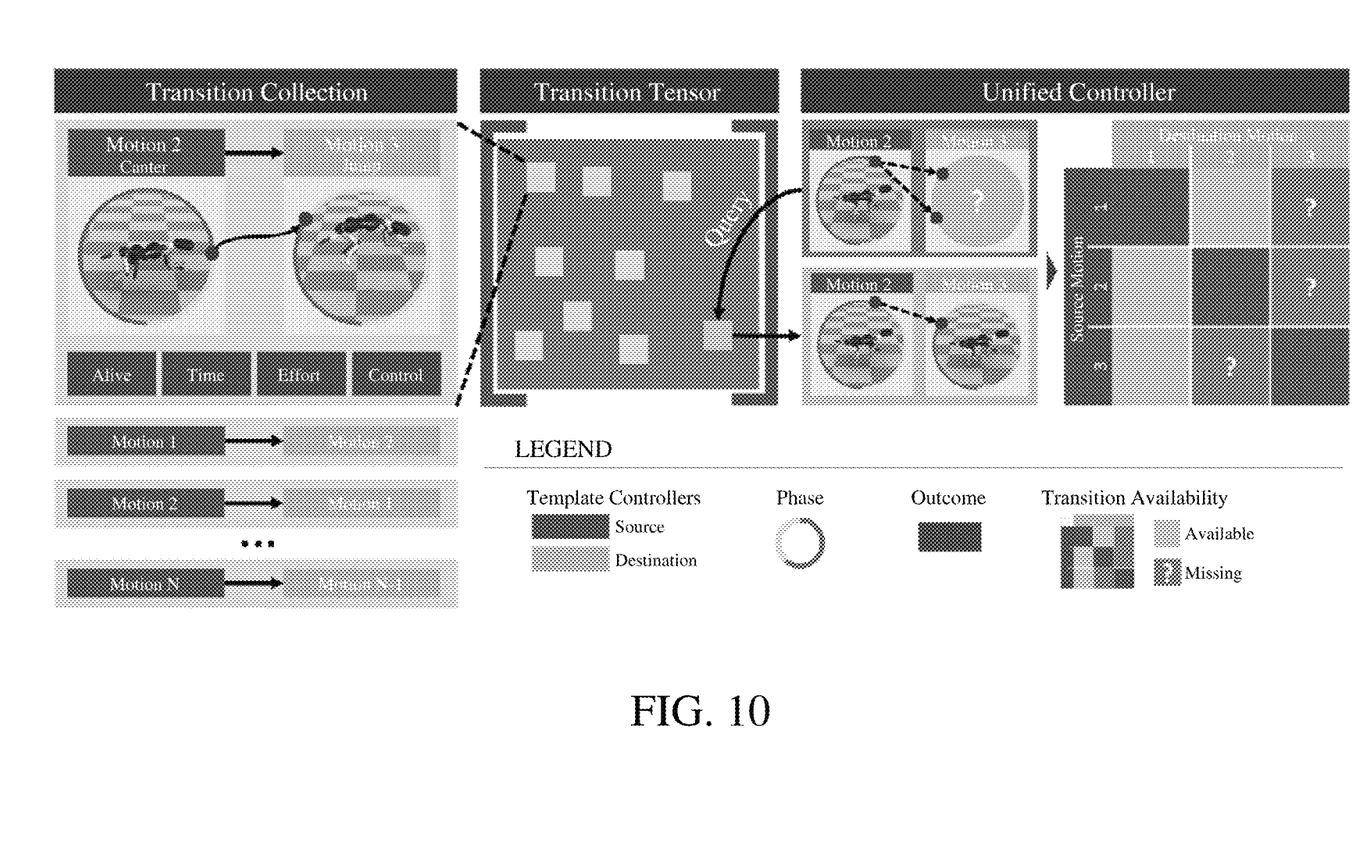
FIG. 10 is a comprehensive schematic diagram of a method for establishing a complex motion controller according to an embodiment of the present disclosure.

In general, please refer to FIG. 10, which is a comprehensive schematic diagram of a method for establishing a complex motion controller according to an embodiment of the present disclosure. The left side of FIG. 10 shows a collection of multiple transition tensors, the content of each transition tensor comprises the alive state, transition time (duration), effort, and control accuracy. Each transition tensor corresponds to a pair of a source controller and a destination controller. Supposed that the number of controller is N, and upper limit of the collection number of the transition tenors is N×(N−1). The middle of FIG. 10 shows completed transition tensors. The right side of FIG. 10 shows an example of generating a unified controller. Assuming that the previous unified controller does not know how to perform the transition from a certain phase of the source motion 2 to the destination motion 3, as indicated by the "?" in the second column and third row of the transition availability matrix, the computing device can find the transition tensor corresponding to the source motion 2 and the target motion 3 among multiple transition tensors, and then finding one or more phase of the destination motion with the best transition quality among all the possibilities of this transition tensor, so as to achieve the transition from source motion 2 to the destination motion 3.

The above embodiments describe the method for establishing a complex motion controller, this method enables the character to grow new motions efficiently and robustly without modifying existing motions. Given several physics-based controllers specializing in different motions, the tensor proposed by an embodiment of the present disclosure serves as a guideline for switching between controllers. By querying the tensor for the best transitions, the present disclosure can create a unified controller capable of producing novel transitions with various behaviors, such as slowing down before higher jumps or jumping immediately for better responsiveness. The present disclosure can be applied on both quadrupeds and bipeds, perform quantitative and qualitative evaluations on transition quality, and demonstrate its capability of tackling complex motion planning problems while following user control directives.

In view of the above, the present disclosure has the following contributions or effects: (1) Allow the user to select different styles of transition motions, and (2) The different styles of transition motions are generated automatically.

What is claimed is:

1. A method of automatically classifying transition motion comprising following steps performed by a computing device:
   obtaining a plurality of transition motions, wherein each of the plurality of transition motions is associated with a source motion, a destination motion, and a transition mechanism converting the source motion into the destination motion;
   extracting a property vector from each of the plurality of transition motions and thereby generating a plurality of property vectors, wherein each of the plurality of property vectors comprises a plurality of transition properties; and
   performing a classifying algorithm according to the plurality of property vectors to generate a plurality of transition types;
   wherein obtaining the plurality of transition motions comprises: generating the plurality of transition motions by a complex motion controller, the transition mechanism is a transition tensor, and the method of automatically classifying transition motion further comprises:

obtaining a source controller and a destination controller, wherein the source controller is configured to generate a source motion, and the destination controller is configured to generate a destination motion;

determining the transition tensor between the source controller and the destination controller, wherein the transition tensor has a plurality of indices, and one of the plurality of indices represents a plurality of phases of the source motion;

calculating a plurality of transition outcomes of the transition tensor and recording the plurality of transition outcomes according to the plurality of indices, wherein each of the plurality of transition outcomes comprises an alive state, a transition duration, an effort, and a control accuracy;

calculating a plurality of transition qualities according to the plurality of transition outcomes; and searching for an optimal transition quality from the plurality of transition qualities to establish a complex motion controller for generating a complex motion corresponding to one of the plurality of phases.

2. The method of automatically classifying transition motion of claim 1, wherein the plurality of transition properties comprises a height of center of mass and a forward acceleration.

3. The method of automatically classifying transition motion of claim 1, wherein the classifying algorithm is K-means algorithm, and a value of K is generated by an elbow method.

4. The method of automatically classifying transition motion of claim 1, wherein the classifying algorithm is hierarchy clustering method.

5. The method of automatically classifying transition motion of claim 1, wherein each of the plurality of transition motions comprises a plurality of keyframes.

6. The method of automatically classifying transition motion of claim 1, wherein each of the plurality of transition qualities comprises stability, and the computing device refers to an alive probability of the alive state, a local neighborhood of an outcome value, and one of the plurality of transition outcomes associated with the local neighborhood to calculate the stability based on a plurality of neighboring phases and said one of the plurality of phases, wherein the local neighborhood comprises a plurality of reference phases, and the plurality of reference phases correspond to one of the plurality of phases of the source motion corresponding to the transition tensor corresponding to the outcome value.

7. The method of automatically classifying transition motion of claim 1, wherein calculating the plurality of transition qualities according to the plurality of transition outcomes comprises:

calculating an outcome value and stability of each of plurality of transition outcomes; and calculating one of the plurality of transition qualities according to the outcome value and the stability; wherein the computing device refers to the alive state, the transition duration, the effort, and the control accuracy to calculate the outcome value based on a plurality of neighboring phases and said one of the plurality of phases; and the computing device refers to an alive probability of the alive state, a local neighborhood of the outcome value, and said one of the plurality of transition outcomes associated with the local neighborhood to calculate the stability based on a plurality of neighboring phases and said one of the plurality of phases, wherein the local neighborhood comprises a plurality of reference phases, and the plurality of reference phases correspond to one of the plurality of phases of the source motion corresponding to the transition tensor corresponding to the outcome value.

8. The method of automatically classifying transition motion of claim 1, wherein the source controller or the destination controller generates each of the source motion and the destination motion according to a current state and a control objective, the source controller and the destination controller belong to a template controller, the template controller comprises at least one low-level controller corresponding to at least one primitive, and the control objective is directly assigned to said at least one low-level controller.

9. The method of automatically classifying transition motion of claim 8, wherein an input of the control objective comprises at least one physical control parameter.

* * * * *